United States Patent [19]

Sano et al.

[11] Patent Number: 4,923,935

[45] Date of Patent: * May 8, 1990

[54] PROCESS FOR PRODUCING POLYETHYLENE OF ULTRAHIGH MOLECULAR WEIGHT

[75] Inventors: Akira Sano, Kawasaki; Shigeki Yokoyama, Yokohama; Yasunosuke Miyazaki, Machida; Tetsujiro Kuroishi, Chiba; Kazuo Matsuura, Tokyo, all of Japan

[73] Assignee: Nippon Oil Co., Ltd., Tokyo

[*] Notice: The portion of the term of this patent subsequent to Nov. 22, 2005 has been disclaimed.

[21] Appl. No.: 302,564

[22] Filed: Jan. 26, 1989

Related U.S. Application Data

[63] Continuation of Ser. No. 148,487, Jan. 26, 1988, abandoned, which is a continuation of Ser. No. 28,486, Mar. 20, 1987, abandoned, which is a continuation of Ser. No. 807,977, Dec. 12, 1985, abandoned.

[30] Foreign Application Priority Data

Dec. 21, 1984 [JP]  Japan ................................. 59-270181

[51] Int. Cl.$^5$ ............................................... B01J 8/00
[52] U.S. Cl. ...................................... 526/73; 526/90; 526/95; 526/107; 526/185

[58] Field of Search ..................... 526/65, 73, 90, 95, 526/107, 185

[56] References Cited

U.S. PATENT DOCUMENTS 4,786,687  11/1988  Sano et al. ......................... 525/240

Primary Examiner—Joseph L. Schofer
Assistant Examiner—Tom Weber
Attorney, Agent, or Firm—Bucknam and Archer

[57] ABSTRACT

A process for producing polyethylene of ultrahigh molecular weight having an intrinsic viscosity of 10-30 dl/g at 135° C. in decalin is disclosed which comprises at least the following two stages of polymerization reaction: (a) a first reaction stage where in ethylene is polymerized with use of a catalyst comprising a solid component containing at least Mg, Ti and/or Va and in the absence or presence of hydrogen of reduced concentration to produce 70-99.5 weight parts of polyethylene having an intrinsic viscosity of 12-32 dl/g at 135° C. in decalin; and (b) a second reaction stage wherein a fresh feed of ethylene is polymerized in the presence of hydrogen of higher concentration to produce 30-0.5 weight parts of polyethylene having an intrinsic viscosity of 0.1-5 dl/g at 135° C. in decalin.

5 Claims, No Drawings

PROCESS FOR PRODUCING POLYETHYLENE OF ULTRAHIGH MOLECULAR WEIGHT

This is a continuation, of application Ser. No. 148,487, filed January 26, 1988 now abandoned which was a continuation of Ser. No. 028,486 filed March 20, 1987 now abandoned; which was a continuation of Ser. No. 807,977 filed December 12, 1985 now abandoned.

BACKGROUND OF THE INVENTION

1. Field of the Invention

This invention relates to a process for the production of ethylene polymers and more particularly to a process for producing polyethylene of ultrahigh molecular weight by employing a selected mode of multi-stage polymerization reaction and a catalyst of a selected composition therefor.

2. Description of the Prior Art

An ethylene polymer with an extremely high molecular weight of about one million or greater is generally known as ultrahigh molecular weight polyethylene (hereinafter referred to simply as "UHMW polyethylene"). UHMW polyethylene is known in common use as engineering plastic material characterized by high impact and wear resistance and self-lubricity, and hence it has found extensive application to hoppers, silos, gears, linings and the like for use in the various fields of industry including food processing, civil engineering, chemistry, agriculture and mining, and further to backings for skis, and sports and leisure supplies.

Because of its high molecular weight, UHMW polyethylene is literally too viscous for molding in hot melt and even in solution, meaning that it is only marginally moldable. This presents a bottleneck in the efforts of opening up new areas of market for UHMW polyethylene in spite of the aforesaid excellent properties.

Methods commonly used to mold UHMW polyethylene are compression, extrusion, injection, spinning, casting and the like. The molding or forming operation of UHMW polyethylene was very slow and involved extremely high pressure and other stringent conditions, and was capable of forming articles of only limited dimensions and poor finish. UHMW polyethylene was thus considered economically infeasible compared to ethylene polymers of lower molecular weights of about 10,000 to about 200,000. In solution moldings such as spinning and casting where UHMW polyethylene material is dissolved in organic solvents, the material was difficult to solubilize as fast and homogeneously as desired.

Alternatively, polyolefin waxes and petroleum resins have been used as additives to improve moldability of UHMW polyethylene, but their compatibility was not satisfactory, resulting in molded articles of reduced mechanical strength and low impact resistance.

SUMMARY OF THE INVENTION

It is the primary object of the present invention to provide a process for producing UHMW polyethylene which is uniform in its polymer particle distribution and is readily soluble in a wide variety of organic solvents and which in particular exhibits enhanced performance in melt and solution moldings, giving molded articles of excellent quality.

The above and other objects and advantages of the invention can be attained by the provision of a process for producing polyethylene of ultrahigh molecular weight having an intrinsic viscosity of 10-30 dl/g at 135° C. in decalin, which process comprises at least the following two stages of polymerization reaction:

(a) a first reaction stage wherein an ethylene monomer is polymerized with use of a composite catalyst comprising a solid component containing at least magnesium, titanium and/or vanadium and an organometallic compound and in the absence of hydrogen or in the presence of hydrogen of reduced concentration to produce 70-99.5 parts by weight of polyethylene having an intrinsic viscosity of 12-32 dl/g at 135° C. in decalin; and (b) a second reaction stage wherein a fresh feed of ethylene monomer is polymerized in the presence of hydrogen of higher concentration to produce 30-0.5 parts by weight of polyethylene having an intrinsic viscosity of 0.1-5 dl/g at 135° C. in decalin.

The UHMW polyethylene of the present invention has the following characteristic features:

(1) High homogeneity and reduced quality change.

(2) Enhanced moldability such as by compression, extrusion and injection.

(3) High solubility in a variety of organic solvents and freedom of gel to permit formation of high quality spun fibers and cast films.

DETAILED DESCRIPTION OF THE INVENTION

The process of the invention for producing UHMW polyethylene is characterized by a multi-stage polymerization reaction including at least the following two stages.

The first reaction stage involves forming an ethylene homopolymer in an amount of 70-99.5 parts by weight, preferably 75-99 parts by weight. This homopolymer is 12-32 dl/g in intrinsic viscosity (n) as measured at 135° C. in decalin. The reaction is effected by polymerizing an ethylene monomer in a solvent or in a gas phase and in the presence of hydrogen of 0-10 mol percent and with use of a catalyst later described. Reaction pressures are in the range of 0-70 kg/cm$^2$.G and reaction temperatures are in the range of 0°-90° C., preferably 20°-80° C.

Solvents eligible for the purpose of the invention are at large those inert to Ziegler catalysts and include for example saturated hydrocarbons such as butane, pentane, hexane, heptane, octane and cyclohexane and aromatic hydrocarbons such as benzene, toluene and xylene. There may also be used organic high-boiling solvents such as decalin, tetralin, decane, kerosine and the like when desired for a particular mode of UHMW polyethylene molding.

The second reaction stage involves forming an ethylene homopolymer or copolymer in an amount of 30-0.05 parts by weight, preferably 25-1 parts by weight. This polymer is 0.1-5 dl/g in intrinsic viscosity at 135° C. in decalin. The reaction is effected by polymerizing a fresh feed of ethylene monomer or by copolymerizing the latter with an α-olefin monomer in the presence of hydrogen of 35-95 mol percent. Reaction pressures are in the range of 0-70 kg/cm$^2$.G and reaction temperatures are in the range of 40° C.-100° C., preferably 60°-90° C. The catalyst may be replenished if necessary. α-Olefins eligible for copolymerization in the second stage are monomers copolymerizable with ethylene in the presence of Ziegler catalysts and include for example propylene, butene-1,4-metylpentene-1, hexene-1 and octene-1. These monomers should be added in small amounts of about 0.1–5 mol percent, and larger amounts should be avoided to preclude a decline in the molecular weight of the polymer.

In addition to the foregoing two stages, there may be employed an extra stage or stages wherein polymer components of higher or lower molecular weight are added to provide a wider range of polyethylene products.

It is known that the wider the molecular weight distribution of a resin, the better is its moldability. To this end, there are used multi-stage polymerization methods, and the blending of resins of varying molecular weights.

It has now been found that UHMW polyethylene of the desired properties according to the invention can be obtained by strict observance of the specific sequence of reaction in which polyethylene of a higher molecular weight is initially formed, followed by the formation of additional polyethylene of a lower molecular weight. Reversal of this sequence, given sufficient molecular weight distribution, fails to provide UHMW polyethylene contemplated by the invention.

While exact reasoning for the peculiar moldability characteristics of UHMW polyethylene of the invention is not known, it is believed that the particulate polymer has a multiplex structure consisting of an inner phase of predominant lower molecular weight polymer which presumably acts as a plasticizer under melt molding conditions (usually at 180°–280° C.) and thus contributes to improved moldability.

Solvents eligible for solution molding include for example aromatic compounds such as toluene, xylene, methyldiphenylmethane, naphthalene, o-dichlorobenzene and trichlorobenzene, and other organic compounds such as decalin, tetralin, iso-paraffin, paraffin wax, kerosine, terpene and the like. It is believed attributable to the above multiplex structure of UHMW polyethylene that this is readily soluble in these solvents without gel formation.

The catalyst used in the invention essentially comprises an inorganic solid component and an organometallic compound. The solid catalyst component includes at least magnesium, titanium and/or vanadium, and it is typically a titanium compound carried in a known manner upon a magnesium-containing solid compound.

The inorganic magnesium-containing compounds include for example magnesium, magnesium hydroxide, magnesium carbonate, magnesium oxide, magnesium chloride and the like, double salts, mixed oxides, carbonates, chlorides and hydroxides each containing both a metal selected from silicon, aluminum and calcium and a magnesium atom, and those compounds derived by treating the inorganic compounds with organic oxygen-containing compounds such as water, alcohols, phenols, ketones, aldehydes, carboxylic acids, esters, polysiloxanes, acid amides and the like, inorganic oxygen-containing compounds such as alkoxides and oxyacid salts of metals and the like, organic sulfur-containing compounds such as thiols, thioethers and the like, inorganic sulfur-containing compounds such as sulfur oxide, sulfur trioxide, sulfur and the like, monocyclic or polycyclic aromatic hydrocarbons such as benzene, toluene, xylene, anthrathene, phenanthrene and the like, or halogen-containing compounds such as chlorine, hydrogen chloride, chlorides of metals, organic halides and the like.

Titanium compounds to be carried on the above inorganic magnesium-containing solid compounds include for example halides, alkoxy chlorides, alkoxides and halogen oxides of titanium and the like. Preferred among these are tetravalent and trivalent titanium compounds.

Eligible tetravalent titanium compounds are those having the formula $$Ti(OR)_n X_{4-n}$$

where R is an alkyl group of 1 to 20 carbon atoms or an aryl or aralkyl group, X is a halogen atom and n is $0 \leq n \leq 4$.

Specific examples include titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium, tetraphenoxytitanium and the like.

Eligible trivalent titanium compounds are those derived by reducing titanium tetrahalides such as titanium tetrachloride and titanium tetrabromide with hydrogen, aluminum, titanium or organometallic compounds in Groups I to III of the Periodic Table, or by reducing tetravalent alkoxytitanium halides of the formula $$Ti(OR)_m X_{4-m}$$

where R is an alkyl group of 1 to 20 carbon atoms or an aryl or aralkyl group, X is a halogen atom and m is $0 < m < 4$, with organometallic compounds in Groups I to III.

Tetravalent titanium compounds are particularly preferred. Vanadium compounds also eligible as the solid catalyst component include for example tetravalent vanadium compounds such as vanadium tetrachloride, pentavalent vanadium compounds such as vanadium oxytrichloride and o-alkyl vanadate and trivalent vanadium compounds such as vanadium trichloride.

Further details of the solid catalyst components are disclosed for example in Japanese Patent Publication Nos. 51-3514, 50-23864, 51-152, 52-15111, 52-11710 and 51-153 and Japanese Patent Application (Kokai) Nos. 49-106581 and 56-95909. Modified forms of solid catalyst components may be used in the invention. One such form involves using a reaction product of Grignard compounds with titanium compounds as disclosed for example in Japanese Patent Publication Nos. 50-39470, 54-12953 and 54-12954 and Japanese Patent Application (Kokai) No. 57-79009. Another example uses and inorganic oxide together with an organic carboxylic acid ester, which ester is disclosed to be an arbitrary additive in Japanese Patent Application (Kokai) Nos. 56-47407, 57-187305 and 58-21405.

Organoaluminum compounds according to the invention are represented by the formulae $$R_3Al,$$

$$R_2AlX,$$

$$RAlX_2,$$

$R_2AlOR$, $RAl(OR)X$, and $R_3Al_2X_3$ where R is an alkyl group of 1 to 20 carbon atoms or an aryl or aralkyl group, R being identical or different, and X is a halogen atom, and including triethylaluminum, triisobutylaluminum, trihexylaluminum, trioctylaluminum, diethylaluminum chloride, diethylaluminum ethoxide, ethylaluminum sesquichloride and mixtures thereof. There is no particular restriction imposed on the amount of the organoaluminm compounds which however may be usually in the range of 0.1–1,000 times per mole of titanium compound.

It has now been found that polymerization activity can be greatly enhanced by contacting an α-olefin preferably of the above-mentioned type with the catalyst system prior to the initiation of the polymerization reaction and that this pretreatment leads to more stable polymerization reaction.

No particular restriction is imposed on the time length and temperature of contact between the catalyst and the α-olefin. However, it is usually convenient to pre-catalyze the olefin in an amount of 1–50,000 g., preferably 5–30,000 g., per gram of catalyst at 0°–200° C., preferably 0°–110° C., and for one minute to 24 hours.

The following examples are given to further illustrate the present invention. In these examples, the intrinsic viscosities are those measured at 135° C. in decalin and all parts are by weight unless otherwise specified.

INVENTIVE EXAMPLE 1

(a) Preparation of Solid Catalyst Component

Into a 400-ml stainless steel pot having therein 25 stainless steel balls, each 0.5 inch in diameter, were placed 10 g. of commercially available anhydrous magnesium chloride, 3.3 g. of silicon tetraethyoxide and 0.7 g. of phosphous oxychloride. Ball milling was effected in nitrogen atmosphere at room temperature for 5 hours, followed by the addition of 2 g. of titanium tetrachloride. Ball milling was continued for further 16 hours. There was 32 mg titanium per gram of the resulting solid catalyst component.

(b) Polymerization

A 2-liter stainless steel autoclave equipped with an induction stirrer was purged with nitrogen and charged with 1,000 ml of hexane, 1 mmol of triethylaluminum and 10 mg of the solid catalyst component prepared as above. The mixture was heated with stirring to 60° C. and the system rised to 1.5 kg/cm²·G with hexane vapor pressure. Ethylene was then charged to a total pressure of 10 kg/cm²·G. Polymerization was initiated. Ethylene was successively fed from a 5-liter ethylene metering tank to maintain the system at 10 kg/cm²·G. and polymerization was continued until the pressure of the ethylene tank dropped to 9 kg/cm² (1st reaction stage). The resulting polymer showed an intrinsic viscosity of 18.9 dl/g.

Unreacted ethylene in the system was quickly purged, followed by charge of hydrogen to a total pressure of 7 kg/cm²·G. and then a fresh feed of ethylene to a total pressure of 10 kg/cm²·G. Polymerization was resumed at 60° C. Ethylene feed was continued until the system reached a total pressure of 10 kg/cm²·G. and polymerization was continued until the pressure of the ethylene tank dropped to 1 kg/cm² (2nd reaction stage). The resulting polymer slurry was put into a beaker, and hexane was removed in vacuum to give 62 g. of white polyethylene. The amount of polymer was 90 parts in the first stage and 10 parts in the second stage. The composite polymer showed an intrinsic viscosity of 14.9 dl/g (in decalin at 135° C.).

(c) Test of Moldability

The polymer obtained in this Example was extruded into a sheet at 250° C. with a 30 mm$\phi$ biaxial extruder. Molding was possible at an extrusion rate of 2 kg/hour. This sheet was tested by the Taber abrasion wear method according to JIS K7204 to show a wear of 1.3 mg.

(d) Test of Solubility 0.02 g. of the polymer was added with 50 ml of decalin and dissolved in a constant-temperature vessel at 140° C. for 3 hours. Viscosity was measured at 135° C., and this measurement was possible with least irregularities.

COMPARATIVE EXAMPLE 1

A 2-liter stainless steel autoclave equipped with an induction stirrer was nirogen-purged and charged with 1,000 ml of hexane, 1 mmol of triethylaluminum and 10 mg of the solid catalyst component prepared as in Inventive Example 1(a). The mixture was heated with stirring to 70° C. and the pressure of the system was raised to 1.6 kg/cm²·G. with hexane vapor pressure. Ethylene was then charged to a total pressure of 10 kg/cm²·G. Polymerization was initiated, and ethylene charge was continued until the system reached a total pressure of 10 kg/cm²·G. Polymerization was continued for 20 minutes, whereupon there was obtained 72 g. of white polyethylene whose intrinsic viscosity was 15.8 dl/g.

Moldability of the resulting polymer was examined by the procedure of Inventive Example 1(c), when melt fracture took place in the formed sheet. Solubility was also tested by the procedure of Inventive Example 1(d). It took 10 long hours at 140° C. before satisfactory dissolution was noted.

INVENTIVE EXAMPLE 2

The procedure of Inventive Example 1(b) was followed except that pressure drop in the ethylene tank was 9.5 kg/cm² in the first reaction stage and 0.5 kg/cm² in the second reaction stage, thereby giving 63 g. of white polyethylene. The amount of polymer was 95 parts in the first stage and 5 parts in the second stage. The composite polymer had an intrinsic viscosity of 16.5 dl/g.

Moldability test was conducted by the procedure of Inventive Example 1(c) with the results that molding was possible at an extrusion rate of 1.9 kg/hour. Wear was 1.2 mg by the abrasion wear test.

INVENTIVE EXAMPLE 3

The procedure of Inventive Example 1(b) was followed except that pressure drop in the ethylene tank was 8.5 kg/cm² in the first reaction stage and 1.5 kg/cm² in the second reaction stage, thereby giving 62 g. of white polyethylene. The amount of polymer was 85 parts in the first stage and 15 parts in the second stage. The composite polymer was 13.0 dl/g in its intrinsic viscosity.

The procedure of Inventive Example 1(c) for moldability was followed with the results that molding was possible at an extrusion rate of 2.2 kg/hour. Wear was 1.4 mg by the abrasion wear test.

INVENTIVE EXAMPLE 4

(a) Preparation of Solid Catalyst Component

The procedure of Inventive Example 1(a) was followed except that 1.9 g. of boron triethoxide was used in place of 3.3 g. of silicon tetraethoxide. The resulting solid catalyst component contained 35 mg of titanium per gram catalyst.

(b) Polymerization

An autoclave similar to that employed in Inventive Example 1(b) was charged with 1,000 ml of hexane, 2 mmol of diethylaluminum chloride and 10 mg of the solid catalyst component prepared as in this Inventive Example. The mixture was heated with stirring to 40° C. and the system rised to 1.3 kg/cm$^2$·G. with hexane vapor pressure. Ethylene was then charged to a total pressure of 10 kg/cm$^2$·G. Polymerization was initiated, and ethylene feed was continued from a 5-liter ethylene tank to maintain the system at 10 kg/cm$^2$·G. Polymerization was continued until the pressure of the ethylene tank dropped to 9 kg/cm$^2$ (1st reaction stage). The resulting polymer had an intrinsic viscosity of 26.1 dl/g.

The autoclave was purged of unreacted ethylene and its temperature was elevated to 80° C. Hydrogen was charged to 8 kg/cm$^2$·G and then ethylene to a total pressure of 10 kg/cm$^2$·G. Polymerization was resumed with a fresh feed of ethylene charged to a total pressure of 10 kg/cm$^2$·G. Polymerization was continued until the pressure of the ethylene tank dropped to 1 kg/cm$^2$ (2nd reaction stage). The polymer slurry was taken into a beaker, and hexane was removed in vacuum to give 62 g. of white polyethylene. The amount of polymer was 90 parts in the first stage and 10 parts in the second stage. The composite polymer showed an intrinsic viscosity of 18.0 dl/g. The polymer was tested for moldability by the procedure of Inventive Example 1(c) with the result that molding was possible at an extrusion rate of 1.9 kg/hour. Wear was 1.3 mg by the abrasion wear test.

INVENTIVE EXAMPLE 5

The procedure of Inventive Example 4(b) was followed except that pressure drop in the ethylene tank was 9.5 kg/cm$^2$ in the first reaction stage and 0.5 kg/cm$^2$ in the second reaction stage, thereby giving 63 g. of white polyethylene. The amount of polymer was 95 parts in the first stage and 5 parts in the second stage. The composite polymer had an intrinsic viscosity of 21.0 dl/g. The polymer was tested for moldability by the procedure of Inventive Example 1(c) with the results that molding was possible at an extrusion rate of 1.7 kg/hour. Wear was 1.2 mg by the abrasion wear test.

COMPARATIVE EXAMPLE 2

The procedure of Comparative Example 1 was followed except that 2 mmol of diethylaluminum chloride was substituted for 1 mmol of triethylaluminum and that the solid catalyst component prepared in Inventive Example 4(a) was used. There was obtained 55 g. of white polyethylene, whose intrinsic viscosity was 20.5 dl/g. The polymer was tested for moldability by the procedure of Inventive Example 1(c) with the results that melt fracture occurred in the formed sheet.

What is claimed is:

1. A process for producing polyethylene of ultra-high molecular weight having an intrinsic viscosity of 10–30 dl/g at 135° C. in decalin, which process consists essentially of the following two stages of polymerization reaction:
   (a) a first reaction stage wherein ethylene monomer is polymerized in a reaction vessel with use of a composite catalyst comprising a solid component containing at least magnesium, titanium and/or vanadium and an organoaluminum compound in the presence of 0–10 mol percent of hydrogen at 0°–90° C. and at a pressure of 0–70 kg/cm$^2$·g. to produce 75–99 parts by weight of polyethylene having an intrinsic viscosity of 12–32 dl/g at 135° C. in decalin; and
   (b) a second reaction stage wherein a fresh feed of ethylene monomer is introduced into the same reaction vessel and polymerized in the presence of 35–95 mol percent of hydrogen at 40°–100° C. and at a pressure of 0–70 kg/cm$^2$·g. while retaining the reaction product from the first reaction stage in said reaction vessel to produce 25–1 parts by weight of polyethylene having an intrinsic viscosity of 0.1–5 dl/g at 135° C. in decalin.

2. A process according to claim 1 wherein said organoaluminum compound is represented by the formula $R_3Al$, $R_2AlX$, $RAlX_2$, $R_2AlOR$, $RAl(OR)X$, or $R_3Al_2X_3$ where R is an alkyl group of 1 to 20 carbon atoms or an aryl or aralkyl group, R being identical or different, and X is a halogen atom.

3. The process according to claim 1 wherein said catalyst comprises a solid component having a titanium compound carried on a magnesium-containing solid compound.

4. The process according to claim 3 wherein said magnesium-containing compound is selected from the group consisting of a magnesium metal; a double salt, a mixed oxide, a carbonate, a chloride and a hydroxide, each containing both a silicon, aluminum or calcium metal and a magnesium atom; and a compound derived by treating an inorganic compound with an organic or inorganic oxygen-containing compound, an organic or inorganic sulfur-containing compound, a monocyclic or polycyclic aromatic hydrocarbon, or a halogen-containing compound.

5. The process according to claim 3 wherein said titanium compound is a tetravalent titanium compound represented by the formula $Ti(OR)_nX_{4-n}$ where R is an alkyl group of 1 to 20 carbon atoms or an aryl or aralkyl group, X is a hologen atom and n is $0 \leq n \leq 4$, or a travalent titanium compound derived by reducing a titanium tetrahalide with hydrogen, aluminum, titanium or an organometallic compound in Groups I to III of the Periodic Table or by reducing an alkoxytitanium halide represented by the formula $$Ti(OR)_m X_{4-m}$$

where m is $0 < m < 4$ and R and X are as defined above, with an organometallic compound in Groups I to III.

* * * * *